(12) United States Patent
Schultz et al.

(10) Patent No.: US 6,445,169 B1
(45) Date of Patent: Sep. 3, 2002

(54) LAG COMPENSATING CONTROLLER HAVING AN IMPROVED TRANSIENT RESPONSE

(75) Inventors: Aaron M. Schultz, Sunnyvale; David B. Lidsky, Oakland, both of CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 09/854,305

(22) Filed: May 11, 2001

Related U.S. Application Data

(63) Continuation of application No. 09/753,079, filed on Dec. 29, 2000, now abandoned.

(51) Int. Cl.$^7$ ................................................ G05F 1/40
(52) U.S. Cl. ...................................................... 323/284
(58) Field of Search ................................ 323/268, 269, 323/271, 272, 273, 274, 275, 276, 282, 284, 285, 288

(56) References Cited

U.S. PATENT DOCUMENTS

| | | | |
|---|---|---|---|
| 4,843,390 A | * | 6/1989 | Van Bavel et al. ......... 341/139 |
| 5,278,834 A | | 1/1994 | Mazzola |
| 5,606,248 A | * | 2/1997 | Bourfes et al. ............. 323/273 |
| 4,856,974 A | | 1/1999 | Gervais et al. |
| 5,991,302 A | | 11/1999 | Berl et al. |
| 6,026,080 A | | 2/2000 | Roy |
| 6,225,795 B1 | * | 5/2001 | Stratakos et al. ........... 323/283 |

OTHER PUBLICATIONS

Comer, *Internetworking with TCP/IP*, vol. 1, pp. 174–176, Jan. 2000.

* cited by examiner

*Primary Examiner*—Matthew Nguyen
(74) *Attorney, Agent, or Firm*—Fish & Richardson P.C.

(57) ABSTRACT

A controller and apparatus for use in a control system. The controller includes a first gain element configured to provide a first predetermined gain to an output error signal describing an error in the output of the control system; a compensator including a control loop including a storage element, the control loop receiving the output error signal, a second gain element configured to provide a second predetermined gain to the output of the control loop, and a detector configured to modify the contents of the storage element according to a predetermined adjustment value when a minimum predetermined excursion occurs in the output error signal; and a combiner configured to combine the outputs of the first and second gain elements to produce an output control signal for the control system.

17 Claims, 5 Drawing Sheets

LAG COMPENSATING CONTROLLER HAVING AN IMPROVED TRANSIENT RESPONSE

This application is Continuation of U.S. patent application Ser. No. 09/753,079 filed on Dec. 29, 2000, which is abandoned.

BACKGROUND

The present invention relates to control systems m general, and to voltage regulators in particular. Voltage regulators, such as DC-to-DC converters, are used to provide stable voltage sources for electronic Systems. Efficient DC-to-DC converters are particularly needed for battery management in low power devices, such as laptop computers and mobile phones. Switching voltage regulators (or simply "switching regulators") are known to be an efficient type of DC-to-DC converter. A switching regulator generates an output voltage by converting an input DC voltage into a high frequency voltage, and filtering the high frequency voltage to generate the output DC voltage.

Conventional switching regulators include two switches. One switch is used to alternately couple and decouple an unregulated input DC voltage source, such as a battery, to a load, such as an integrated circuit The other switch is used to alternately couple and decouple the load to ground An output filter, typically including an inductor and an output capacitor, is coupled between the switches and the load to filter the output of the switches and produce the output DC voltage.

The switches within the switching regulator are opened and closed according to commands from a closed-loop control system. Control systems within DC-to-DC converters, just like control systems generally within any electronic system, need to be stabilized. Care in the design of the control system in a DC-to-DC converter must account for variations of parameters such as the input voltage, filter inductor and capacitor values, switch resistances, printed circuit board parasitics, etc. Sometimes a simple scheme such as voltage feedback alone will stably control a power supply. In other situations, extra margin of stability and higher bandwidth are gained by using current mode control techniques. Still other schemes use hysteresis bands to decide how to control the switches.

In some cases, it is desired to add compensation to improve phase margin of a DC-to-DC regulator. Often phase margin can be improved by using a lag compensator, which lowers the overall bandwidth to boost phase at the crossover frequency. Unfortunately, with lowered bandwidth, DC-to-DC regulators take longer to respond to load current transients, resulting in larger output voltage deviations. As a result, many such systems use extra capacitance in the converter's output filter to improve transient response. However, using larger capacitors increases the cost of the regulator substantially.

Commercially-available hysteretic controllers trigger certain responses when the output voltage deviates too high, or too low. However, these controllers do not have a beneficial effect on nominal, steady-state performance while the voltage is within the hysteresis bands, and may add design difficulty due to their non-linear behavior.

SUMMARY

In one aspect, the invention is directed to a controller for use in a control system The controller includes a first gain element configured to provide a first predetermined gain to an output error signal describing an error in the output of the control system; a compensator including a control loop including a storage element, the control loop receiving the output error signal, a second gain element configured to provide a second predetermined gain to the output of the control loop, and a detector configured to modify the contents of the storage element according to a predetermined adjustment value when a minimum predetermined excursion occurs in the output error signal; and a combiner configured to combine the outputs of the first and second gain elements to produce an output control signal for the control system.

Implementations of the invention may include one or more of the following. The output of the control loop is the output of the storage element, and the control loop includes a third gain element configured to provide a third predetermined gain to the output error signal; a delay element configured to provide a predetermined delay to the output of the control loop; a fourth gain element configured to provide a fourth predetermined gain to the output of the delay element; and a second combiner configured to provide to the storage element the sum of the outputs of the third and fourth gain elements. The sum of the third and fourth predetermined gains is one. The detector is configured to load the storage element with the predetermined adjustment value when the minimum predetermined excursion occurs in the output error signal. The controller includes a combiner configured to load the storage element with the sum of the output of the control loop and the predetermined adjustment value when the minimum predetermined excursion occurs in the output error signal. The detector includes two or more comparison elements, each having a different range, and each associated with a different predetermined preload value, each comparison element configured to supply the predetermined preload value associated with that comparison element as the predetermined adjustment value when the output error signal is within the range of that comparison element The storage element can include an accumulator or an integrating capacitor. The detector can include an A/D converter.

In one aspect, the invention is directed to a controller for use in a DC-to-DC converter. The controller includes a first gain element configured to provide a first predetermined gain to an output error signal describing an error in the output of the DC-to-DC converter; a compensator including a control loop including a storage element, the control loop receiving the output error signal, a second gain element configured to provide a second predetermined gain to the output of the control loop, and a detector configured to modify the contents of the storage element according to a predetermined adjustment value when a minimum predetermined excursion occurs in the output error signal; and a combiner configured to combine the outputs of the first and second gain elements to produce an output control signal for the DC-to-DC converter.

In one aspect, the invention is directed to a DC-to-DC converter. The DC-to-DC converter includes a controller including a first gain element configured to provide a first predetermined gain to an output error signal describing an error in the output of the DC-to-DC converter; a compensator including a control loop including a storage element, the control loop receiving the output error signal, a second gain element configured to provide a second predetermined gain to the output of the control loop, and a detector configured to modify the contents of the storage element according to a predetermined adjustment value when a minimum predetermined excursion occurs in the output error signal; and a combiner configured to combine the outputs of the first and second gain elements to produce an output control signal for the DC-to-DC converter.

In one sect, the invention is directed to an apparatus for use in a control system controller having a control loop that includes a storage element, the control loop receiving an output error signal describing an error in the output of the control system. It includes means for modifying the contents of the storage element according to a predetermined adjustment value when a minimum predetermined excursion occurs in the output error signal; means for providing a first predetermined gain to the output error signal; means for providing a second predetermined gain to the output of the control loop; and means for combining the outputs of the first and second gain elements to produce an output control signal.

Advantages that can be seen in implementations of the invention include one or more of the following. The compensator can add phase margin without requiring extra capacitance, can provide enhance stability during steady-state conditions, and does not degrade transient response.

The details of one or more embodiments of the invention are set forth in the accompanying drawings and the description below. Other features and advantages of the invention will become apparent from the description, the drawings, and the claims.

BRIEF DESCRIPTION OF DRAWINGS

Like reference numbers and designations in the various drawings indicate like elements.

DETAILED DESCRIPTION

Figure 1:
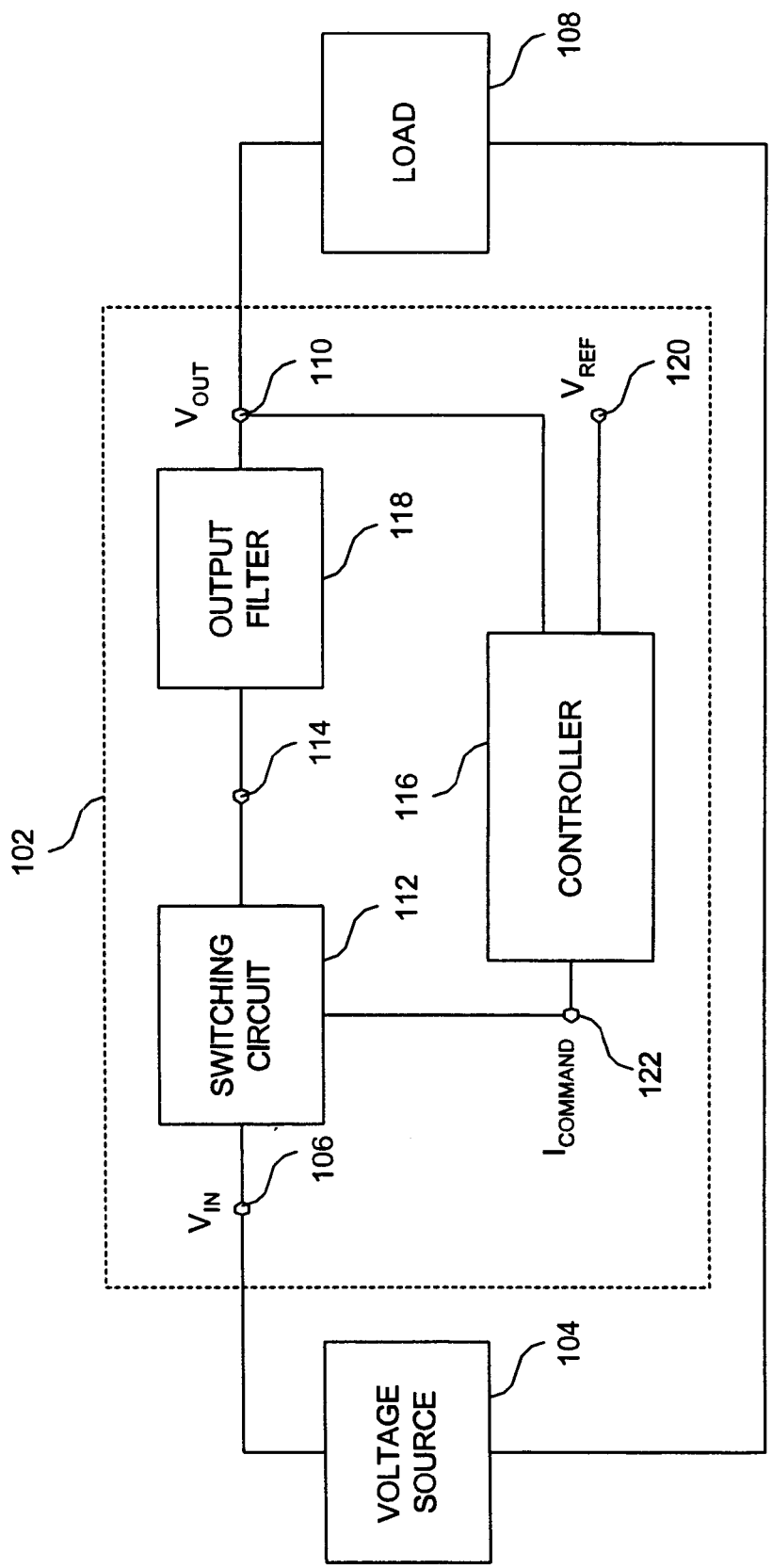
FIG. 1 shows a switching regulator according to an embodiment of the present invention.

Referring to FIG. 1, a switching regulator 102 is coupled to an unregulated DC voltage source 104, such as a battery, by an input terminal 106. The switching regulator 102 is also coupled to a load 108, such as an integrated circuit, by an output terminal 110. The switching regulator 102 serves as a DC-to-DC converter between the input terminal 106 and the output terminal 110. The switching regulator 102 includes a switching circuit 112 which serves as a power switch for alternately coupling and de-coupling the input terminal 106 to an intermediate terminal 114. In some applications, such as a buck converter topology, the switching circuit 112 couples the intermediate terminal 114 to ground when the intermediate terminal 114 is not coupled to the input terminal 106.

The switching regulator also includes a controller 116 for controlling the operation of the switching circuit 112. The controller 116 causes the switching circuit 112 to convert the substantially DC input voltage $V_{IN}$ at the input terminal 106 into an intermediate voltage having a rectangular waveform at the intermediate terminal 114.

The intermediate tern anal 114 is coupled to the output terminal 110 by an output filter 118. The output filter 118 converts the rectangular waveform at the intermediate terminal 114 to a substantially DC output voltage $V_{OUT}$ at the output terminal 110. The switching circuit 112 and the output filter 118 may have a buck converter topology, or another topology, such as a boost converter or buck-booster converter topology.

The output voltage is regulated, or maintained at a substantially constant level, by controller 116. Controller 116 measures electrical properties of the output, such as output voltage and/or output current, and compares these properties to a control electrical property, such as voltage $V_{REF}$ at terminal 120. Based on this comparison, controller 116 provides a current command $I_{COMMAND}$ to the switching circuit 112 at terminal 122.

Switching circuit 112 operates its switches according to the current command $I_{COMMAND}$. Switching circuit 112 can control its switches based not only on the current command, but also on the output current delivered by switching circuit 112 to output filter 118. Other embodiments employ direct feedback without the use of current commands.

Controller 116 includes a control loop including a storage element that stores a nominal value under nominal conditions. However, under certain predetermined transient conditions, the contents of the storage element are modified as described in detail below.

Figure 2:
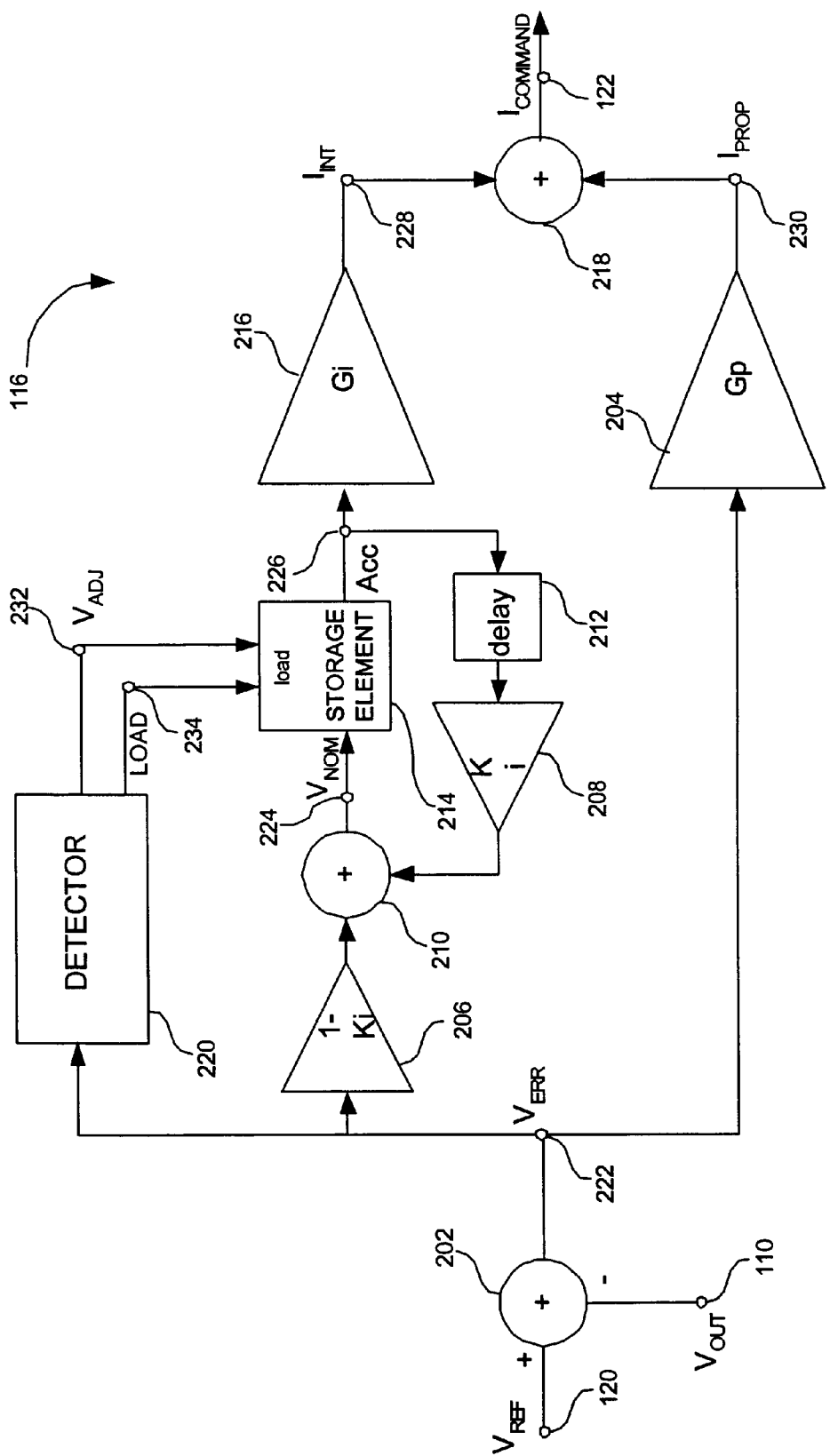
FIG. 2 shows a controller for a switching regulator according to one embodiment of the present invention.

In one embodiment, the storage element is loaded with a predetermined adjustment value under predetermined transient conditions. Referring to FIG. 2, controller 116 includes a combiner 202 that receives reference voltage $V_{REF}$ at terminal 120 and output voltage $V_{OUT}$ at terminal 110, and produces an error voltage $V_{ERR}=V_{REF}-V_{OUT}$ at terminal 222. A gain element 204 applies a gain Gp to $V_{ERR}$ to produce a current $I_{PROP}$ at terminal 230 that is proportional to $V_{ERR}$.

Controller 116 also includes a lag compensator that includes a control loop and a gain element 216 that applies a gain Gi to the output of the control loop to produce a current $I_{INT}$ at terminal 228. Combiner 218 adds currents $I_{PROP}$ and $I_{INT}$ to produce current command $I_{COMMAND}$ at terminal 122.

The control loop includes gain elements 206 and 208, combiner 210, delay element 212, and storage element 214. Gain element 206 applies a gain 1-Ki to $V_{ERR}$, where Ki is the discrete time pole, in the Z-domain unit circle, of the lag compensator. Selection of an appropriate value for Ki will be apparent to one skilled in the relevant art Combiner 210 combines the output of gain elements 206 and 208. Storage element 214 loads the output VNOM of combiner 210 at terminal 224 during nominal operation (that is, when excursions of $V_{ERR}$ do not leave a predefined envelope).

However, when a minimum predetermined excursion occurs in output voltage $V_{OUT}$, error voltage $V_{ERR}$ leaves the predefined envelope. This event is detected by detector 220, which asserts a LOAD signal at terminal 234 and a predetermined adjustment value $V_{ADJ}$ at terminal 232. The LOAD signal causes storage element 214 to load predetermined adjustment value $V_{ADJ}$ at terminal 232, causing the predetermined adjustment value to appear at term 226 as the output Acc of storage element 214.

In digital implementations, storage element 214 can be implemented as an accumulator. In analog implementations, storage element 214 can be implemented as an integrating capacitor.

In digital implementations, detector 220 can be implemented as an A/D converter to determine $V_{OUT}$. The A/D converter is centered at analog reference voltage $V_{REF}$, and outputs a monotonically increasing four bit reading versus $V_{OUT}$ within the predetermined voltage envelope for $V_{REF}$. Below or above that range, the A/D converter clips, or saturates. When the A/D converter saturates, it causes the storage element 214 (here, an accumulator) to preload the predetermined adjustment value. In other embodiments, A/D converters of widths other than four bits are used.

Delay element 212 applies a predetermined delay to the output of storage element 214. Gain element 208 applies gain Ki to the output of delay element 212.

Figure 3:
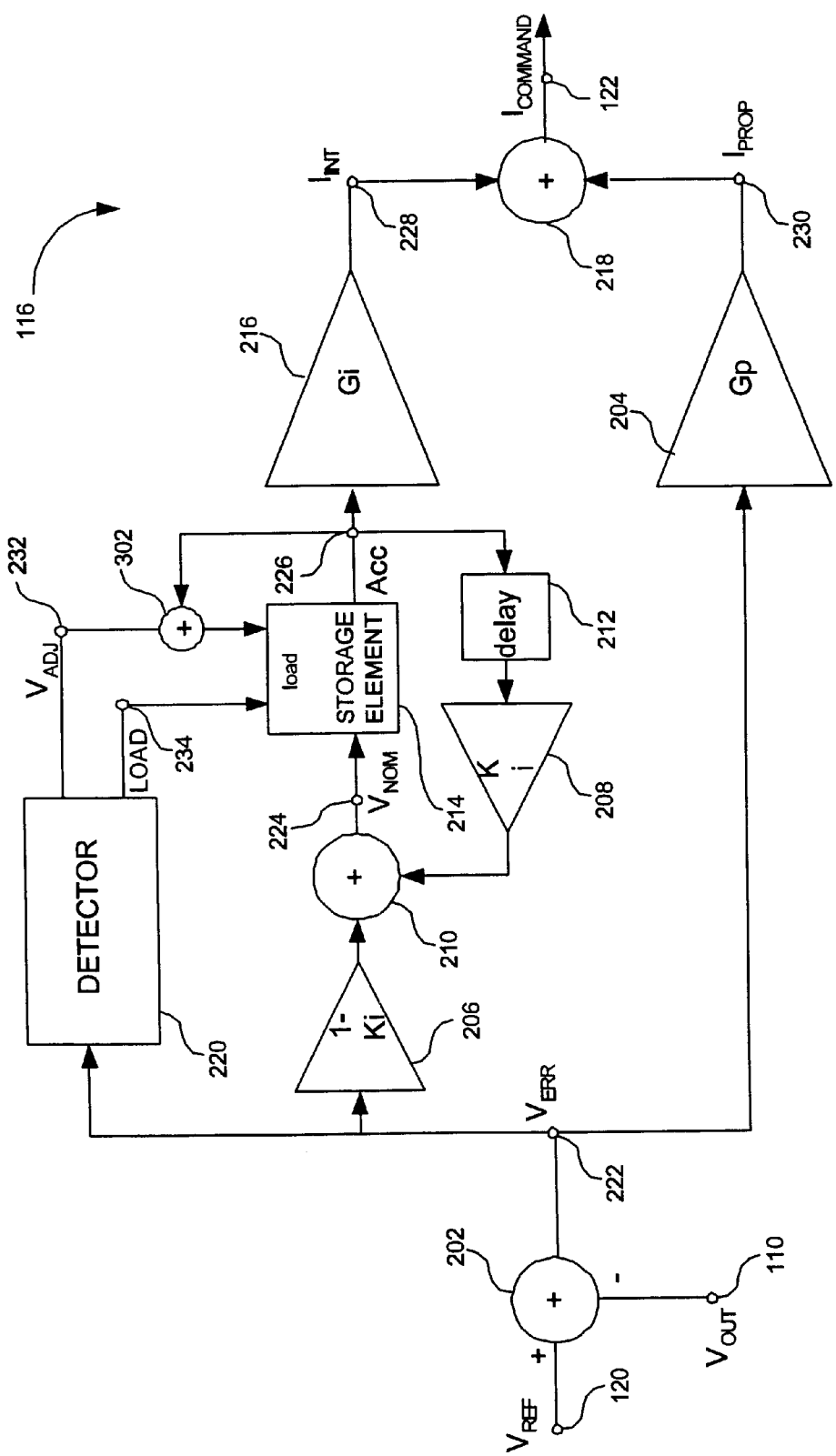
FIG. 3 shows a controller for a switching regulator according to another embodiment of the present invention.

In another embodiment, the contents of the storage element are incremented by a predetermined adjustment value under predetermined transient conditions. Referring to FIG. 3, the adjustment value $V_{ADJ}$ is combined with Acc by combiner 302. When detector 220 asserts the LOAD signal, the output of combiner 302 is loaded into storage element 214, thereby incrementing the contents of storage element 214 by the predetermined adjustment value.

Figure 4:
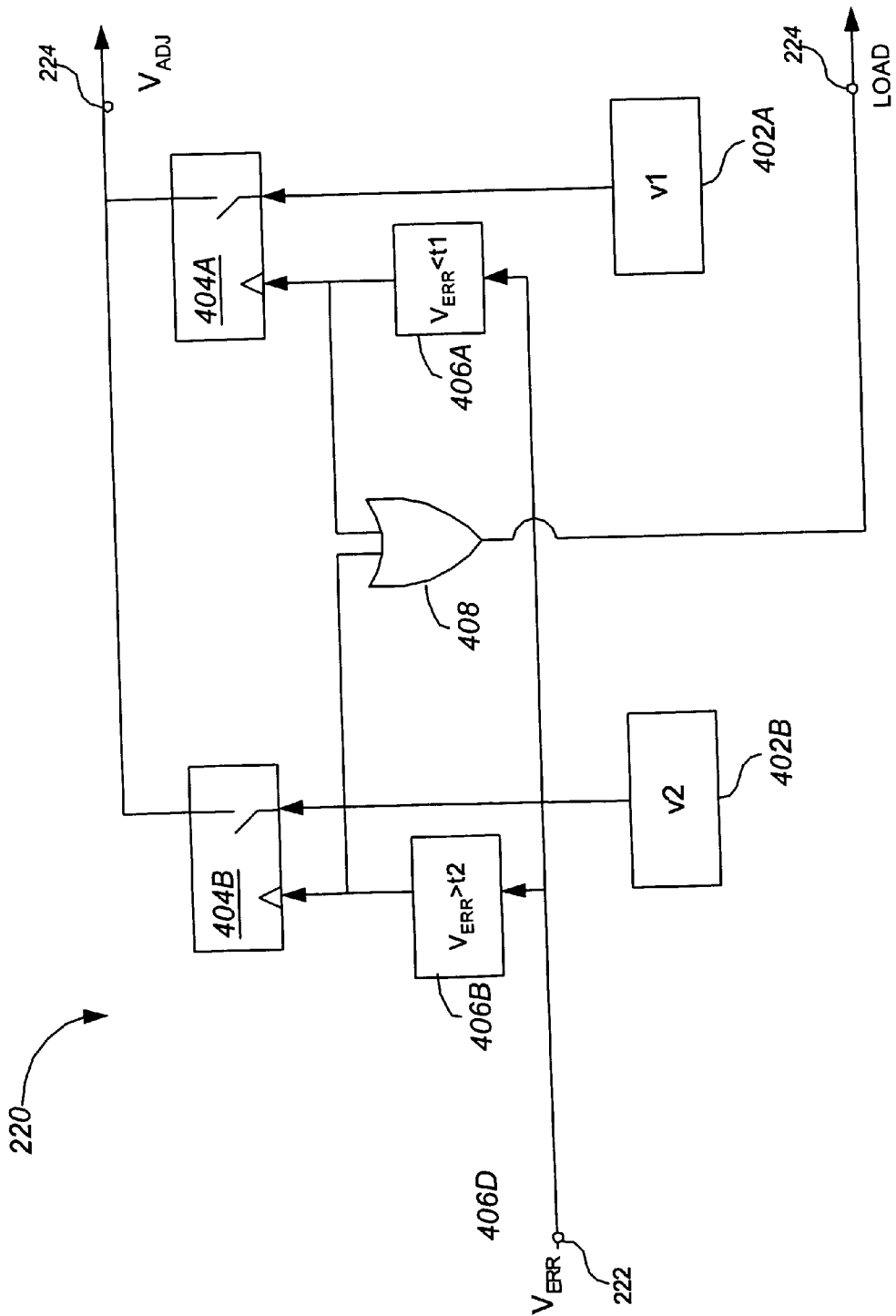
FIG. 4 shows a detector for a switching regulator controller according to an embodiment of the present invention.

FIG. 4 is a functional block diagram of a detector 220 for a switching regulator controller according to an embodiment of the present invention. The detector includes comparison elements 406A and 406B associated with predetermined preload values 402A and 402B, respectively, and switches 404A and 404B, respectively. Each comparison element compares $V_{ERR}$ to a predetermined voltage range. When $V_{ERR}$ falls within a comparison elements range, the comparison element triggers a switch, thereby supplying a predetermined preload value as the adjustment voltage $V_{ADJ}$.

In the embodiment of FIG. 4, detector 220 implements a single envelope bounded by thresholds t1 and t2. When $V_{ERR}$ falls below threshold t1, comparison element 406A triggers switch 404A, thereby supplying v2 as adjustment value $V_{ADJ}$ at terminal 224.

When $V_{ERR}$ exceeds threshold t2, comparison element 406B triggers switch 404B, thereby supplying voltage v2 as adjustment value $V_{ADJ}$ at terminal 224. When either $V_{ERR}$ falls below threshold t1, or when $V_{ERR}$ exceeds threshold t2, OR gate 408 asserts LOAD signal at terminal 224, thereby causing storage element 214 to load.

Under nominal operations $V_{ERR}$ falls between thresholds t1 and t2. Therefore no LOAD signal is generated. Consequently storage element simply loads $V_{NOM}$ under nominal operations.

In one embodiment, detector 220 implements more than one predetermined envelope. The error voltage $V_{ERR}$ is compared to a plurality of ranges, each associated with an envelope. Each range is associated with a predetermined preload value. When $V_{ERR}$ falls within a particular range, the predetermined preload value associated with that range is supplied to storage element 114 as the predetermined adjustment value.

In general, the magnitude of the adjustment corresponds to the magnitude of the envelope. For example, when a small excursion in $V_{ERR}$ occurs, a small adjustment value is supplied to storage element 214. When a large excursion in $V_{ERR}$ occurs, a large adjustment value is supplied to storage element 214.

Selection of an appropriate adjustment values and thresholds will be apparent to one skilled in the relevant art. In general, the adjustment values should be chosen to quickly reduce the output error signal $V_{ERR}$ to a desirable value. The threshold values should be chosen such that nominal operation of the control system is not unnecessarily disturbed.

The behavior of the lag compensator can be described in the time domain. The lag compensation appears as a change in the equation for the current command $I_{COMMAND}$. Without lag compensation, $$I_{COMMAND}=GpV_{ERR}$$

where Gp is the proportional gain and $V_{ERR}=V_{REF}-V_{OUT}$ is the error term from the outer voltage loop. For the discrete-time lag compensation technique discussed above, there is an additional term GiAcc so that $$I_{COMMAND}=GpV_{ERR}+GiAcc$$

and $$Acc[n]=Ki*Acc[n-1]+(1-Ki)V_{ERR}$$

where Acc is the output of the accumulator, which acts as storage element 214 in a discrete time implementation of the system.

The lag compensation pole is defined by Ki. The zero falls out from the combination of these equations in the increased order system, and will always be a higher frequency than the pole for non-zero Gi. The output Acc of the accumulator will reach in steady-state the value $V_{ERR}$. Therefore in steady-state, $$I_{COMMAND}=GpV_{ERR}+GiV_{ERR}$$

Thus the DC gain is now Gp+Gi.

Figure 5:
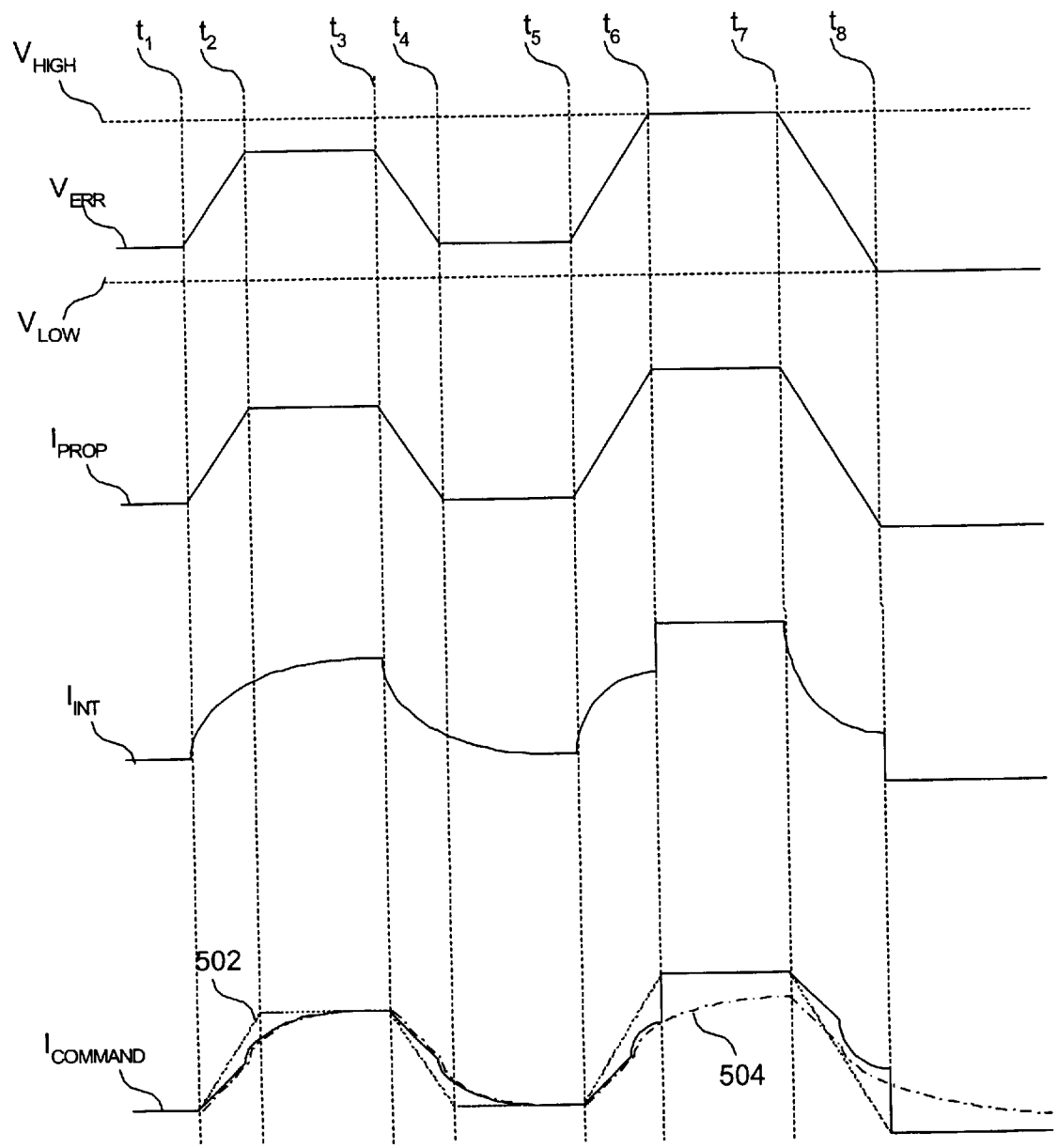
FIG. 5 shows several contemporaneous waveforms that result from transients in the load of the switching regulator of FIG. 1.

FIG. 5 shows several contemporaneous waveforms that result from transients in the load of the switching voltage regulator described above with reference to FIG. 1. An envelope is defined to limit excursions of $V_{ERR}$ to a high of $V_{HIGH}$ and a low of $V_{LOW}$. From time $t_1$ to time $t_4$, nominal operation is depicted (that is, $V_{ERR}$ does not reach either limit $V_{HIGH}$ or $V_{LOW}$ of its envelope).

At time $t_5$, a transient from zero load to full load occurs. In response, $V_{OUT}$ decreases, and so $V_{ERR}$ increases. The proportional part of the current command, $I_{PROP}$, changes with $V_{ERR}$. There is no delay between a $V_{ERR}$ change and an $I_{PROP}$ change. $I_{INT}$, on the other hand, changes slowly due to the Ki pole.

At time $t_6$, $V_{ERR}$ reaches limit $V_{HIGH}$ of its envelope. Before $V_{ERR}$ reaches $V_{HIGH}$, $I_{INT}$ changes slowly with its Ki pole. However, once $V_{ERR}$ reaches an envelope limit, controller 116 determines that a severe load transient has occurred. The controller 116 then step changes $I_{INT}$ to a predetermined final value by preloading storage element 214. The preloading adjusts the total current $I_{COMMAND}$ to the value it would have reached given much moretime.

Two hypothetical waveforms are shown for comparison with the $I_{COMMAND}$ waveform. $I_{COMMAND}$ is shown as a solid line. Waveform 504 depicts how $I_{COMMAND}$ would behave without preloading. Waveform 502 depicts the ideal $I_{COMMAND}$.

At time $t_7$, a transient from full load to zero load occurs. In response, $V_{OUT}$ increases, and so $V_{ERR}$ decreases. The controller behaves in a manner similar to that described above for the zero load to fill load case.

The invention has been described in terms of particular embodiments. Other embodiments are within the scope of the following claims. For example, the steps of the invention can be performed in a different order and still achieve desirable results. In addition, embodiments of the controller of the present invention can be used in control systems other than DC-to-DC converters.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programing language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Embodiments of the controller of the present invention are not limited to lag compensators, but can also be practiced within other types of compensators, such as lead-lag compensators. Further, although the switching regulator is discussed in the context of a buck converter topology, embodiments of the invention are also applicable to other switching regulator topologies, such as a boost converter topology or a buck-boost converter topology.

What is claimed is:

1. A controller for use in a control system, the controller comprising:
   a first gain element configured to provide a first predetermined gain to an output error signal describing an error in the output of the control system;
   a compensator including
      a control loop including a storage element, the control loop receiving the output error signal,
      a second gain element configured to provide a second predetermined gain to the output of the control loop, and
      a detector configured to modify the contents of the storage element according to a predetermined adjustment value when a minimum predetermined excursion occurs in the output error signal; and
   a combiner configured to combine the outputs of the first and second gain elements to produce an output control signal for the control system.

2. The controller of claim 1, wherein the output of the control loop is the output of the storage element, and wherein the control loop further comprises:
   a third gain element configured to provide a third predetermined gain to the output error signal;
   a delay element configured to provide a predetermined delay to the output of the control loop;
   a fourth gain element configured to provide a fourth predetermined gain to the output of the delay element; and
   a second combiner configured to provide to the storage element the sum of the outputs of the third and fourth gain elements.

3. The controller of claim 1, wherein the sum of the third and fourth predetermined gains is one.

4. The controller of claim 1, wherein the detector is configured to load the storage element with the predetermined adjustment value when the minimum predetermined excursion occurs in the output error signal.

5. The controller of claim 1, further comprising a combiner configured to load the storage element with the sum of the output of the control loop and the predetermined adjustment value when the minimum predetermined excursion occurs in the output error signal.

6. The controller of claim 1, wherein the detector comprises:
   two or more comparison elements, each having a different range, and each associated with a different predetermined preload value, each comparison element configured to supply the predetermined preload value associated with that comparison element as the predetermined adjustment value when the output error signal is within the range of that comparison element.

7. The controller of claim 1, wherein the storage element comprises an accumulator.

8. The controller of claim 7, wherein the detector comprises an A/D converter.

9. The controller of claim 1, wherein the storage element comprises an integrating capacitor.

10. A controller for use in a DC-to-DC converter, the controller comprising:
    a first gain element configured to provide a first predetermined gain to an output error signal describing an error in the output of the DC-to-DC converter;
    a compensator including
       a control loop including a storage element, the control loop receiving the output error signal,
       a second gain element configured to provide a second predetermined gain to the output of the control loop, and
       a detector configured to modify the contents of the storage element according to a predetermined adjustment value when a minimum predetermined excursion occurs in the output error signal; and
    a combiner configured to combine the outputs of the first and second gain elements to produce an output control signal for the DC-to-DC-converter.

11. A DC-to-DC converter comprising:
    a controller including
       a first gain element configured to provide a first predetermined gain to an output error signal describing an error in the output of the DC-to-DC converter;
       a compensator including
          a control loop including a storage element, the control loop receiving the output error signal,
          a second gain element configured to provide a second predetermined gain to the output of the control loop, and
          a detector configured to modify the contents of the storage element according to a predetermined adjustment value when a minimum predetermined excursion occurs in the output error signal; and
       a combiner configured to combine the outputs of the first and second gain elements to produce an output control signal for the DC-to-DC converter.

12. An apparatus for use in a control system controller having a control loop that includes a storage element, the control loop receiving an output error signal describing an error in the output of the control system, the apparatus comprising:

means for modifying the contents of the storage element according to a predetermined adjustment value when a minimum predetermined excursion occurs in the output error signal;

means for providing a first predetermined gain to the output error signal;

means for providing a second predetermined gain to the output of the control loop; and means for combining the outputs of the first and second gain elements to produce an output control signal.

13. The apparatus of claim 12, wherein the output of the control loop is the output of the storage element, further comprising:

means for providing a third predetermined gain to the output error signal;

means for providing a predetermined delay to the output of the control loop;

means for providing a fourth predetermined gain to the output of the delay element; and means for providing to the storage element the sum of the outputs of the third and fourth gain elements.

14. The apparatus of claim 12, wherein the sum of the third and fourth predetermined gains is one.

15. The apparatus of claim 12, wherein modifying comprises:

means for loading the storage element with the predetermined adjustment value when the minimum predetermined excursion occurs in the output error signal.

16. The apparatus of claim 12, wherein the means for modifying comprises:

means for loading the storage element with the sum of the output of the control loop and the predetermined adjustment value when the minimum predetermined excursion occurs in the output error signal.

17. The apparatus of claim 12, wherein the means for modifying comprises:

means for comparing the output error signal to two or more ranges, each range associated with a different predetermined preload value; and means for supplying a predetermined preload value associated with a range when the output error signal is within that range.

\* \* \* \* \*

UNITED STATES PATENT AND TRADEMARK OFFICE
CERTIFICATE OF CORRECTION

PATENT NO. : 6,445,169 B1
DATED : September 3, 2002
INVENTOR(S) : Aaron M. Schultz and David B. Lidsky It is certified that error appears in the above-identified patent and that said Letters Patent is hereby corrected as shown below:

<u>Title page,</u>
Item [56], References Cited, U.S. PATENT DOCUMENTS, please replace "4,856,974" with -- 5,856,974 --

Signed and Sealed this

Twentieth Day of May, 2003

JAMES E. ROGAN
*Director of the United States Patent and Trademark Office*